(12) United States Patent
Hayden et al.

(10) Patent No.: US 12,053,110 B2
(45) Date of Patent: Aug. 6, 2024

(54) MULTI-POSITIONABLE CHILD HOLDER

(71) Applicants: Kiley Hayden, Redmond, OR (US);
Cole Hayden, Redmond, OR (US)

(72) Inventors: Kiley Hayden, Redmond, OR (US);
Cole Hayden, Redmond, OR (US)

( * ) Notice: Subject to any disclaimer, the term of this patent is extended or adjusted under 35 U.S.C. 154(b) by 123 days.

(21) Appl. No.: 17/859,391

(22) Filed: Jul. 7, 2022

(65) Prior Publication Data

US 2023/0371718 A1 Nov. 23, 2023

Related U.S. Application Data

(60) Provisional application No. 63/342,752, filed on May 17, 2022.

(51) Int. Cl.
*A47G 9/06* (2006.01)
*B60N 2/28* (2006.01)

(52) U.S. Cl.
CPC .......... *A47G 9/068* (2013.01); *B60N 2/2803* (2013.01); *B60N 2/2812* (2013.01)

(58) Field of Classification Search
CPC ..... A47G 9/068; B60N 2/2812; B60N 2/2803
See application file for complete search history.

(56) References Cited

U.S. PATENT DOCUMENTS

| 4,993,090 | A | * | 2/1991 | Ranalli | A47G 9/068 5/482 |
| 5,243,724 | A | * | 9/1993 | Barnes | A41B 13/06 224/159 |
| 6,145,932 | A | * | 11/2000 | Hamel-Nyhus | B60N 2/2881 297/219.12 |
| 7,384,098 | B1 | * | 6/2008 | Allwin | B60N 2/2881 297/219.12 |
| 10,874,230 | B2 | * | 12/2020 | Green | B60N 2/2806 |
| 2022/0087451 | A1 | * | 3/2022 | Morris | A47G 9/0223 |

FOREIGN PATENT DOCUMENTS

GB 2374525 A * 10/2002 ............. A47G 9/068

* cited by examiner

*Primary Examiner* — Milton Nelson, Jr.
(74) *Attorney, Agent, or Firm* — Donn K. Harms (57) ABSTRACT

A child holder having a body defined by a sidewall surrounding an interior cavity is positionable to locate the legs and torso of a child into an interior cavity thereof. The child holder can be maintained engaged in an as-used position on the child when being moved to and between child carriers. The child holder is also maintained in the as-used position when securing and unsecuring a conventional three to five point harness conventionally connected to such child carriers.

8 Claims, 7 Drawing Sheets

MULTI-POSITIONABLE CHILD HOLDER

This application claims priority to U.S. Provisional patent application Ser. No. 63/342,752 filed on May 17, 2022 which is incorporated herein in its entirety by this reference thereto.

FIELD OF THE INVENTION

The present application relates to flexible carriers for small children and infants. More particularly, it relates to a carrying bag or blanket, which has an interior cavity which is positionable on the torso and legs of a child or infant and which allows for secured positioning to the infant to multiple carriers such as strollers, child carriers and car seats.

BACKGROUND OF THE INVENTION

In decades past, small children and infants were simply carried in vehicles and strollers and the like without the requirements for safety belting. Instead, children in the past were simply positioned in a car seat or stroller without any restraints in an action which more modernly would not be considered safe or proper.

In recent times, it was realized by governments and parents alike, that an infant or small child can be easily ejected when positioned in such an unrestrained manner in a car seat. Further, once they have gained even minimal movement skills, small children and infants can easily climb or move in such a manner, that they can fall from their positioning in a stroller, child carrier, or car seat.

As a result, manufacturers of child carriers such as car seats, strollers, and hand-held child seats, have included a restraint system which will maintain the belted infant or child within the seat they occupy once the parent or caretaker has secured the belts and harness. This restraint system has modernly resulted in a significant decrease in injuries to infants and small children who occupy such child carriers and are positioned therein with the harness secured.

In many countries, the government has dictated that child car seats, strollers, and carriers must all be equipped with a restraint system in a manner that the seat is configured specifically to protect children from injury or death during vehicle collisions. A tangent to this government requirement has been the evolution of booster seats, strollers, and similar child carriers to include similar restraint systems to aid in maintaining the infant or child safely secured.

The forgoing description concerning child restraints and various uses thereof is intended to be illustrative and not exclusive. As such, no limitations on the invention described and claimed herein is to be associated with such. Further, additional limitations and features of the current art of child restraints are well known, or such will become apparent to those skilled in the art upon a reading and understanding of the specification below and the accompanying drawings.

SUMMARY OF THE INVENTION

The system and device herein, in various modes, provides for an enclosed blanket for infants and small children. The blanket device is configured with a blanket body having a sidewall which surrounds and defines an interior cavity. The sidewall is preferably formed of fabric such as wool, fleece, down, polyester, nylon, bamboo, GORTEX, or combinations thereof. The sidewall can be formed in layers, such as having wool and/or fleece on an internal layer closest to the interior cavity and nylon or polyester on the exterior. Such will yield a sidewall which helps prevent the communication of moisture and cold air to the child within and the loss of heat from the interior cavity of the blanket body but will still breathe to allow moisture to evaporate.

The first end or top end of the blanket body has an opening positioned therein. This opening communicates through the first end of the body and into the interior cavity. The two sides and second or bottom end of the blanket body are closed.

The blanket device is thus configured to allow for positioning on and around the torso and legs of an infant or small child. At the opening, at the upper or first end of the blanket body, elastic or a similar biasing material may be attached to the sidewall to surround the opening. This will cause the sidewalls to biasly contact with the torso of the child or infant once they are positioned with their torso and legs located within the interior cavity.

The sidewall of the blanket device herein may be configured with an insulation layer and/or padding. When so configured, the sidewall will surround and form an insulated interior cavity for positioning of the child or infant therein.

The configuration of the blanket and positioning thereof, with the torso and legs of the child held within the interior cavity, thus insures that the infant or child will also be unable to kick off the blanket and also keeps the blanket from falling off during movement. The elastic, surrounding the body of the infant or child at the open end, biasly contacts against the child and maintains the sidewall in position as well as prevents the passage of cold air into the interior cavity. Thus, the blanket device herein insures that the child will stay warm.

Additionally, because the child or infant is positioned within the interior cavity and surrounded by the blanket, once so engaged, even when the child is not positioned in a car seat or stroller or the like, it allows the child to be held by someone such as on the hip or lap, without the user having to worry about the blanket coming loose.

In all modes of the blanket device, it is preferred that a restraint pathway be provided to allow for the engagement of the anchor or crotch strap of a conventional three-point or five-point harness to the infant or child. Such harnesses are conventionally provided on car seats, child carrying seats, and booster seats and the like.

The formed restraint pathway of the blanket device herein provides for easy engagement of the harness to the child and securement of such to the seating device in which the infant and blanket device is positioned. Further, the provision of such a restraint pathway, allowing communication of the securement end of the harness to the chair, carrier, or vehicle, in which such is located, provides significant gains in utility in that the child or infant can be moved from one child carrier to another, without the removal of the blanket body from the child or infant, which is a significant convenience factor.

Additionally preferred, in all modes of the blanket device herein, is a frontal cavity formed at the exterior of the front portion of the sidewall forming the body of the blanket device. This frontal cavity provides for the positioning of the central or chest clip therein, which engages to the anchor strap which communicates through the blanket body along the restraint pathway.

Thus, once the infant or child is positioned within the interior cavity, they may be positioned in the car seat, stroller, or other child carrier of choice. During the positioning of the child into the chosen car seat, carrier, or stroller, the central anchoring strap, which is engaged to it at a first end, is threaded through the restraint pathway to position a distal end of the anchoring strap within the frontal cavity. This distal end has a connector which removably engages with the chest clip and thereby positions the chest clip secured within the frontal cavity.

The frontal cavity has strap openings communicating therewith on opposing sides of the frontal cavity. The straps and/or lap belts are engageable with the chest clip by threading their distal ends through the opposing strap openings. Once they are engaged to the chest clip, positioned within the frontal cavity, the child or infant is securely restrained to the stroller, carrier, car seat or the like.

As noted, removal is made easy in that disengagement of the chest clip from the anchoring or crotch strap along with the shoulder and/or lap restraints. As noted, the child or infant does not need to be removed from their positioning within the interior cavity to disengage them from the restraints and/or to engagement into a different carrier having such three-point or five-point restraints.

Further, the positioning of the chest clip and connections thereto, within the frontal cavity, locates it out of the field of vision of the child or infant and out of their reach. This is especially preferred to prevent older children from attempting to disengage the shoulder restraint straps and/or lap restraints from the chest clip.

With regard to the above disclosure, those skilled in the art will appreciate that the conception upon which this disclosure is based may readily be utilized as a basis for designing other child blanket devices for use in combination with child carriers, strollers, and car seats and the like, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" when employed herein, means plus or minus twenty percent unless it is specifically otherwise designated in differing range.

It is an object of the present invention to provide a child blanket that allows the torso and legs of the child to be maintained within an interior cavity during positioning of the child in a car seat, child carrier, or stroller which has child restraints.

It is a further object of the present invention to provide such a child blanket device which allows for the movement of the child between differing strollers, car seats, and carriers and the like, and re-engagement of child restraints, without having to remove the child from the blanket.

It is an additional object of this invention to provide a child blanket that cannot be kicked off by the child and maintains a warm positioning with the child positioned in a stroller or carrier or while being held by a parent or caretaker.

These and other objects, features, and advantages of the presently disclosed child blanket device and system herein, as well as the advantages thereof over existing prior art which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed multi-positionable child holder or blanket. It is intended that the embodiments and figures disclosed herein are to be considered illustrative of the invention herein, rather than limiting in any fashion.

In the drawings.

DETAILED DESCRIPTION OF THE INVENTION

In this description, the directional prepositions of up, upwardly, down, downwardly, front, back, top, upper, bottom, lower, left, right, front, back, and other such terms refer to the device as it is oriented and appears in the drawings and are used for convenience only and such are not intended to be limiting in any fashion, or to imply that the device has to be used or positioned in any particular orientation.

In all modes of the device 10 herein, it is configured for use with a conventional child carrier 42, such as a car seat or stroller, which employ a harness system to secure the child 12 therein and for movement between secured positioning of the device 10 and the child 12 within it between such child carriers 42 without the need to remove the device 10 from engagement to the child.

Figure 1:
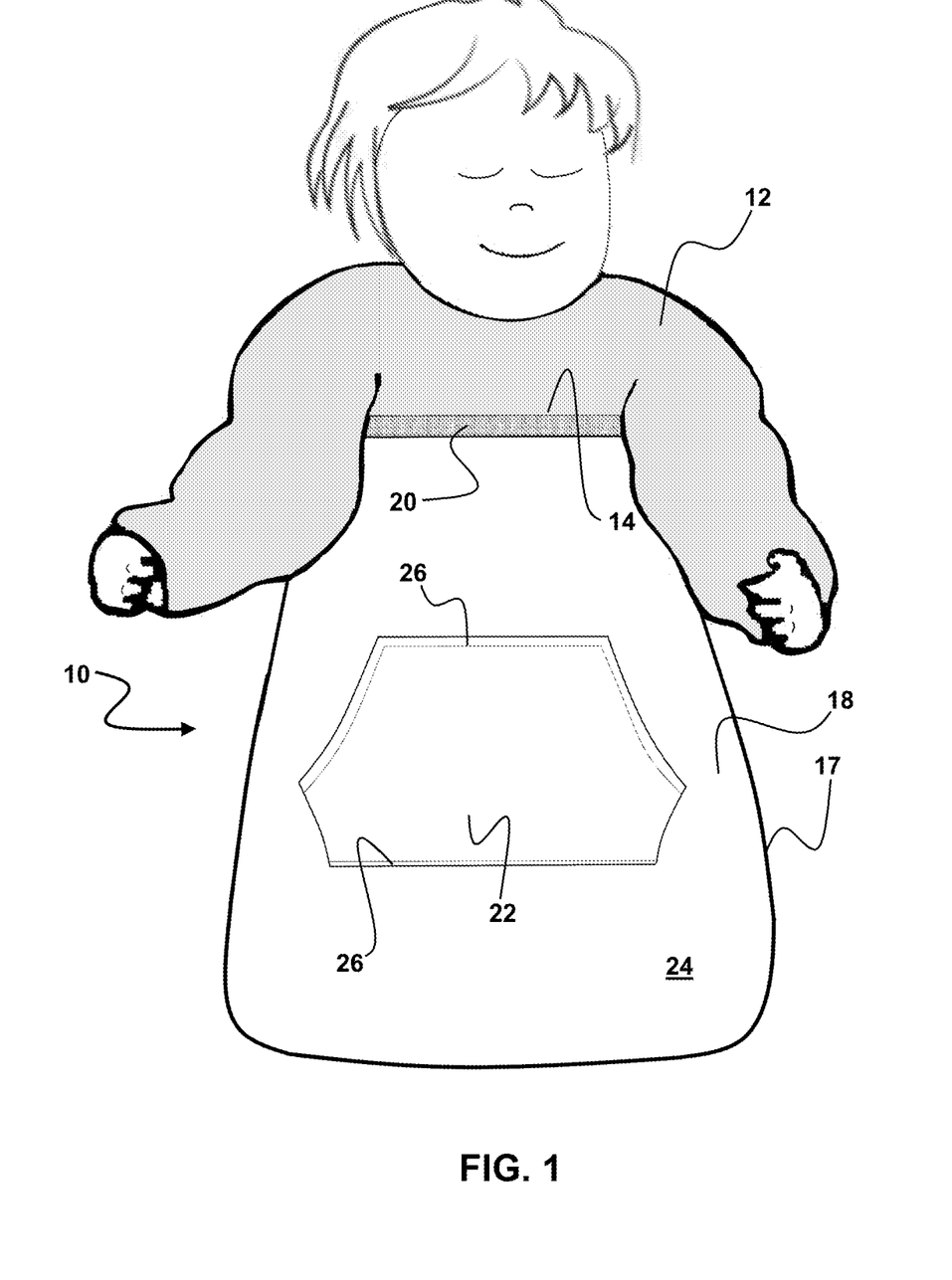
FIG. 1 shows the child or infant holder device herein in an as-used positioning where the torso and legs of the child are positioned within an interior cavity of the body of the blanket.

Now referring to drawings in FIGS. 1-7 wherein similar components are identified by like reference numerals, there is seen in FIG. 1 the blanket device 10 having a child 12 in an as-used positioning. As shown, the torso or a portion thereof and legs of the child 12 are communicated through an opening 14 and positioned within an interior cavity 16 (FIG. 7) of the blanket device 10 in such an as-used positioning.

The blanket device 10 has a body 17 which has a sidewall 18 which defines and surrounds the interior cavity 16 of the device 10. The size or dimensions of the sidewall 18 thus determine the size and area of the interior cavity 16 which it surrounds.

Preferably, elastic material 20 is operatively engaged to the sidewall 18 at the first end of the body 17 in a manner that surrounds the opening 14 which allows communication therethrough and into the interior cavity 16. The elastic 20 is stretched as the legs and torso of the child 12 are positioned through the opening 14 and into the interior cavity 16. The elastic 20 thereafter operates to impart an inward biasing force to the opening 14. This forms a biased contact of the sidewall 18 at the opening 14 against the torso of the child 12 with the bag device 10 operatively positioned in an as-used positioning upon the child 12. The biased contact helps prevent communication of air, exterior to the body 17, from communicating into the interior cavity 16 and will prevent cold air from gaining entry.

Also shown in FIG. 1 is a frontal material section 22 which is attached to the exterior surface 24 of the sidewall 18. The frontal material section 22 is permanently attached along portions of the perimeter edge 26 thereof such as by stitches from sewing or by adhesive or other means for connecting it to the exterior surface 24. As shown, the frontal material section 22 is positioned on a sidewall 18 which forms a front of the body 17 of the blanket device 10.

Figure 2:
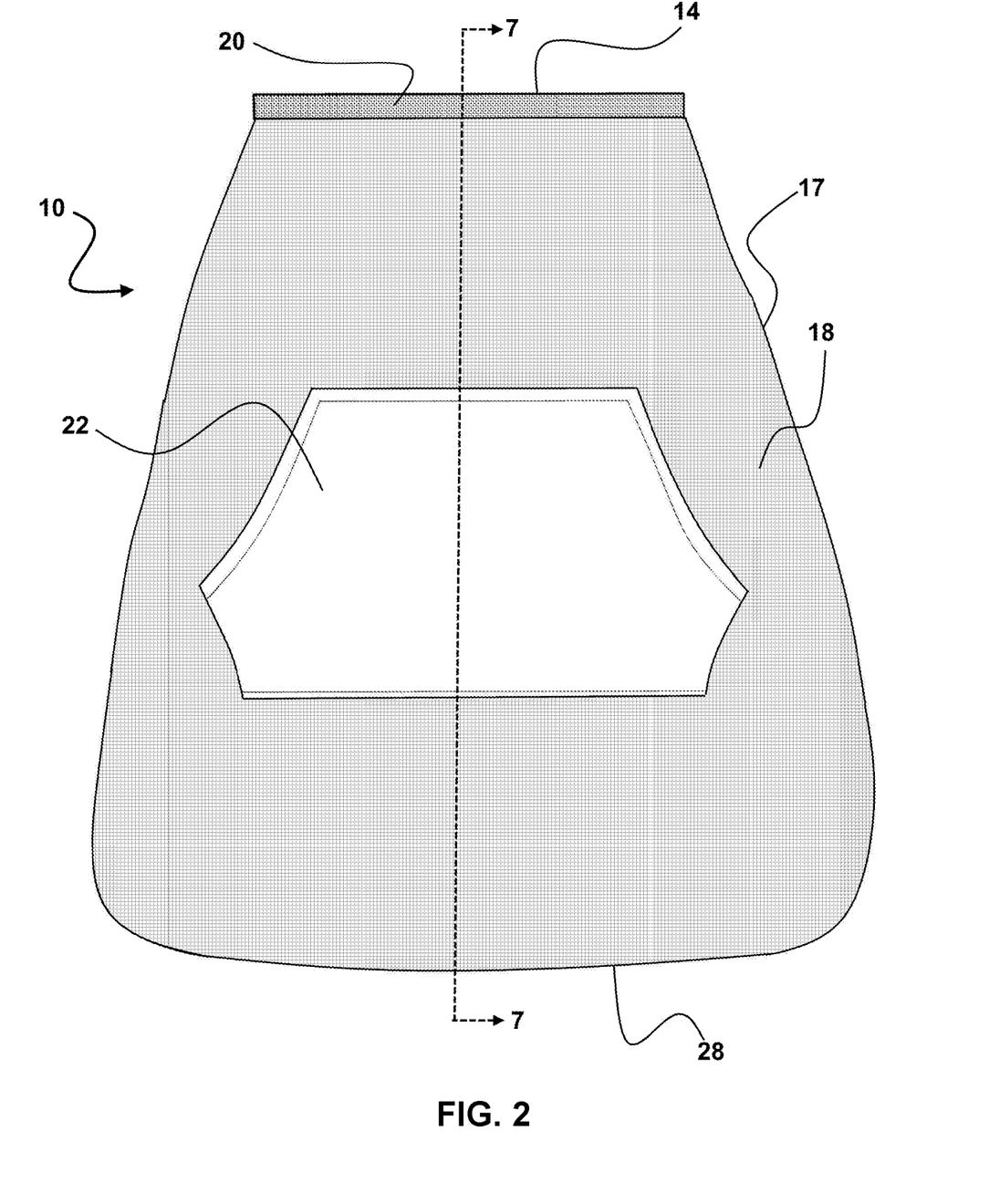
FIG. 2 shows a front side of the sidewall defining the blanket body of the device herein and shows a cover layer engaged on the exterior surface thereof, which forms the frontal cavity and frontal openings communicating therewith.

In FIG. 2 is shown the front side of the body 17 formed by the sidewall 18, the size and shape of which defines the size and shape of the blanket body 17. As shown, the body 17 is narrower at the first end where the opening is positioned and progressively widens toward the second end 28. This forms the interior cavity 16 wider in the area where the feet and the legs of the child 12 are positioned, during use, to give them room to move.

Also shown in FIG. 2 is the frontal material section 22 which, as noted, is attached to the exterior surface 24 of the sidewall 18, preferably on the front side of the body 17. As noted herein, this forms a frontal cavity 30 (FIG. 7) between the frontal material section 22 and the exterior surface 24 of the sidewall 18 of the body 17 of the device 10.

Figure 3:
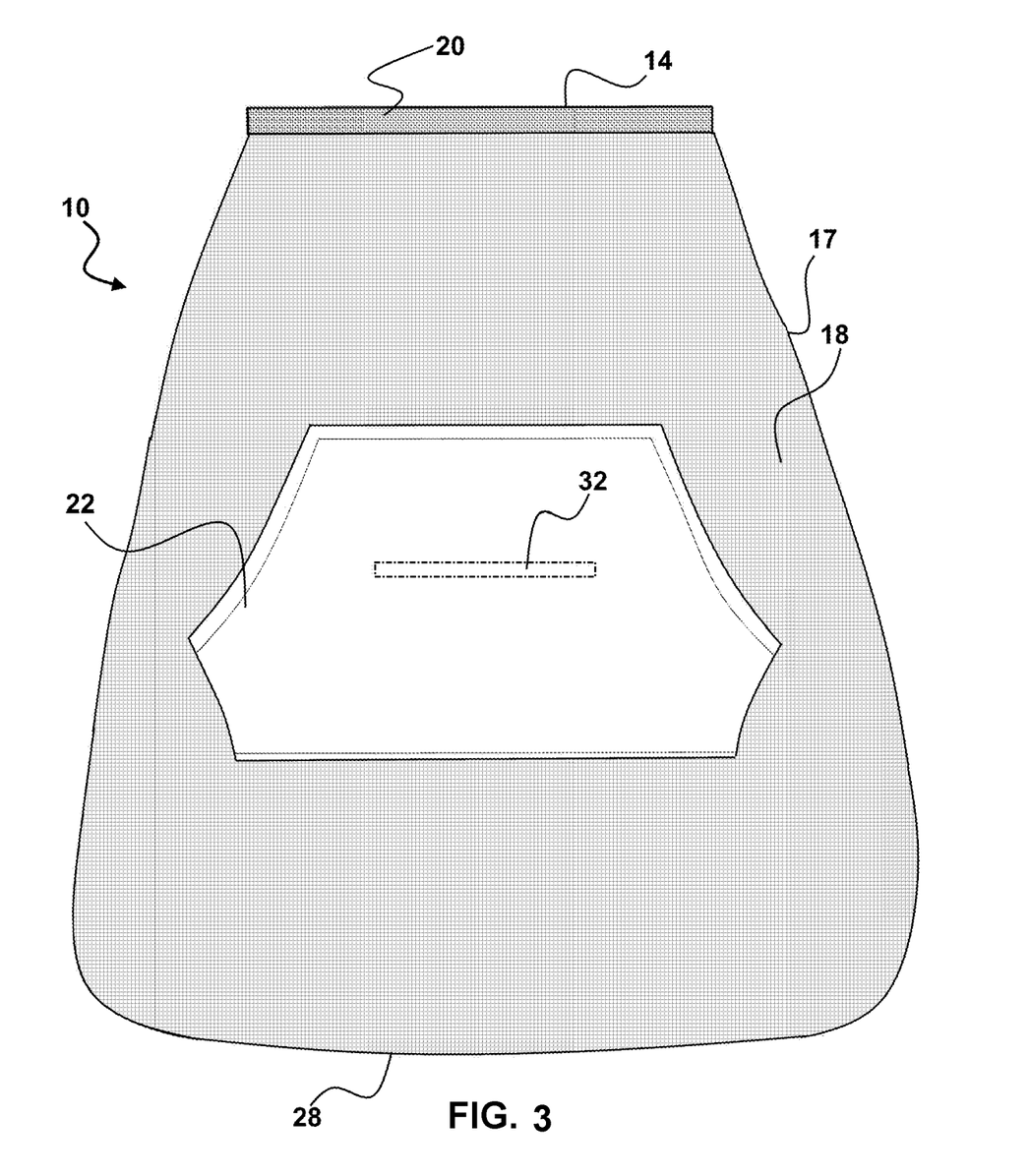
FIG. 3 depicts in dotted line a frontal opening that communicates through the sidewall on the front side of the body of the blanket device and with the frontal cavity.

In FIG. 3 is shown a frontal opening 32. The frontal opening 32 is depicted in dotted line to signify it is formed behind the frontal material section 22 and within the frontal cavity 30. The frontal opening 32 forms a passage or opening communicating through the sidewall 18 on the front side of the body 17. The frontal opening 32 thus provides a passage communicating between the frontal cavity 30 and the interior cavity 16 of the body 17.

Figure 4:
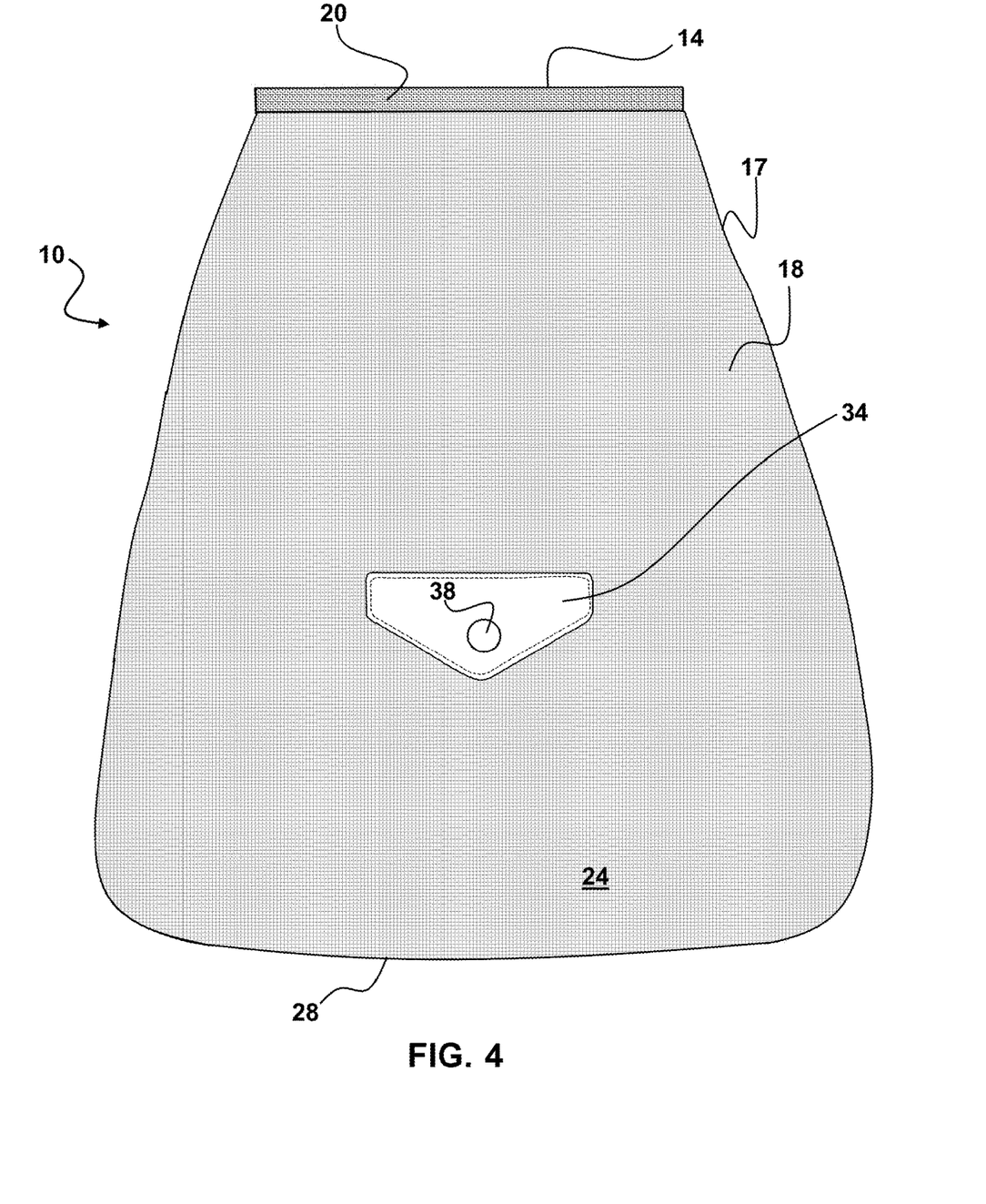
FIG. 4 shows a rear side of the blanket body which has a removably securable flap thereon which covers a rear opening which communicates through the rear side and with the interior cavity of the formed blanket body.
Figure 5:
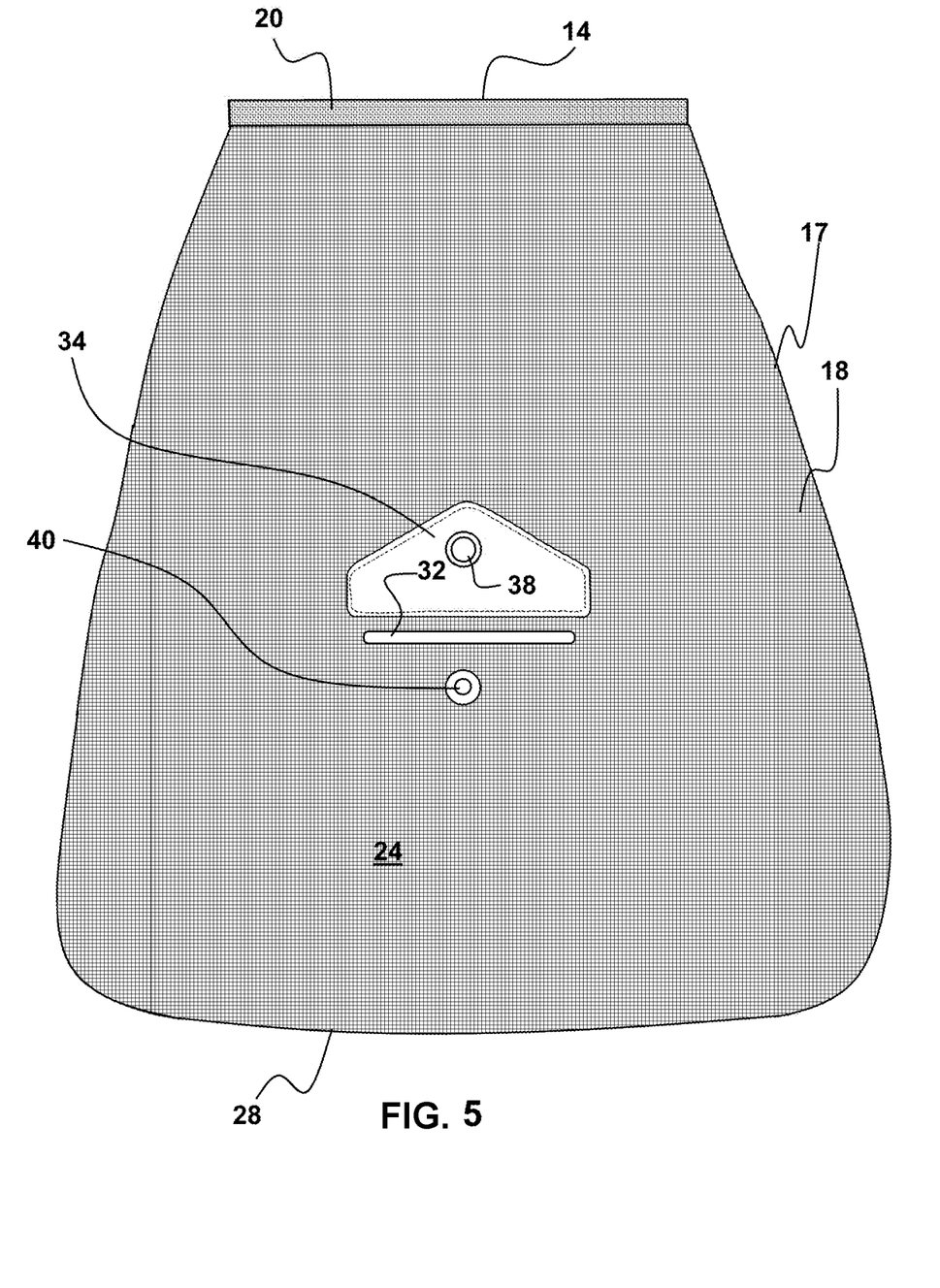
FIG. 5 depicts the rear side of the blanket body, as in FIG. 4, but shows the flap raised to expose the rear opening which communicates with the interior cavity of the formed blanket body.

Shown in FIGS. 4-5 herein are views of the rear side of the body 17 of the device 10. As shown, there is engaged to the exterior surface 24 of the sidewall 18 on the rear of the body 17, a flap 34. While the device 10 will function just as well without the flap 34, it is preferred that the flap 34 is included to provide a cover to a rearward opening 36 which communicates through the sidewall 18 on the rear side of the body 17 of the device 10 to prevent drafts and cold air from entering the interior cavity 16 through the rearward opening 36 which provide a passage thereto. The flap 34 can be secured to the covering position of FIG. 4 by a fastener 38 which removably connects to a cooperating fastener 40, such as a snap and button or other cooperative fasteners as would occur to those skilled in the art.

Figure 6:
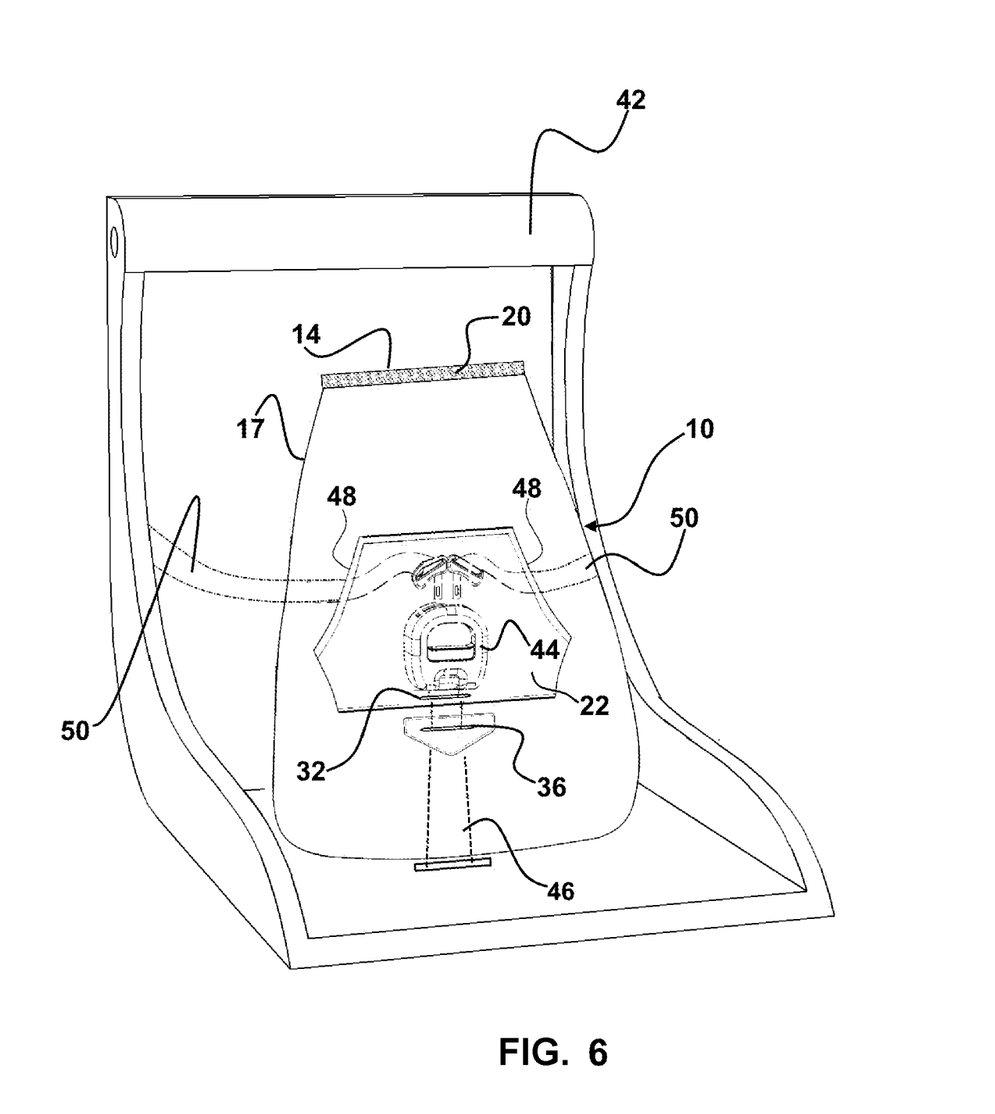
FIG. 6 shows the blanket body of the device herein operatively positioned in an as-used positioning with a seat, stroller, carrier, car seat, or other carrier into which a child is secured using restraints and shows the chest clip located within the frontal cavity and connected to the anchor strap which has been threaded through the formed passageway.

In FIG. 6 is shown an example of the blanket body 17 of the device 10 herein operatively located in an as-used positioning with child carrier 42, such as, for example, a stroller, a car seat, a hand-held child carrier, or other carrier into which a child 12 is conventionally secured using three to five point restraints.

Also shown in FIG. 6 is a conventional chest clip 44 provided on conventional child carriers 42 having a three to five point harness to secure the child 12 in a child carrier 42. Where the frontal material section 22 is included to form the frontal cavity 30, the chest clip 44 of such conventional harnesses will be located within the frontal cavity 30.

It should be noted that the frontal material section 22 forming the frontal cavity 30 is most preferred to thereby locate the chest clip 44 within the frontal cavity 30 and out of sight and manipulation by the child 12. Further, the provision of the frontal cavity 30 has shown in experimentation, where the chest clip 44 is positioned therein, to provide a significant improvement in the prevention of side to side movement of the body 10 of the device 10 which is important to prevent harm to children by such movements. However, even without the frontal cavity 30, the device 10 will function to maintain the child 12 warm while positioned on the child 12 using the anchor strap pathway 52, which is provided, to allow securement in multiple different child carriers 42. The harness straps 50 will be secured to the chest clip 44 along with the anchor strap 46 and provide at least a three point harness of the child 12 with the device 10 in the as-used position and the child 12 positioned in the child carrier 42.

The conventional chest clip 44, when positioned within the frontal cavity 30 in the preferred configuration, is operatively connected to the anchor strap 46 which follows the anchor strap pathway 52 attached to such child carriers 42 between the seat of the child carrier 42 and the chest clip 44 of such child carriers 42. As noted above, the preferred positioning of the chest clip 44 within the frontal cavity 30 hides it from view and from access thereto by the child 12 thereby eliminating any manipulation by the secured child of the chest clip 44 and the straps and clips connected to it and provides better resistance to side-to-side movement by limiting movement of the chest clip 44 away from the body 17 and limiting sliding on the exterior of the body 17.

Securement openings 48 provide passages for the harness straps 50 such as shoulder straps and lap straps and other conventional straps employed upon and with a conventional child harness of such conventional child carriers 42. Thus, the two harness straps 50 can communicate through the two securement openings 48 and connect to the chest clip 44, which as noted, is well known for harness connections for such.

Figure 7:
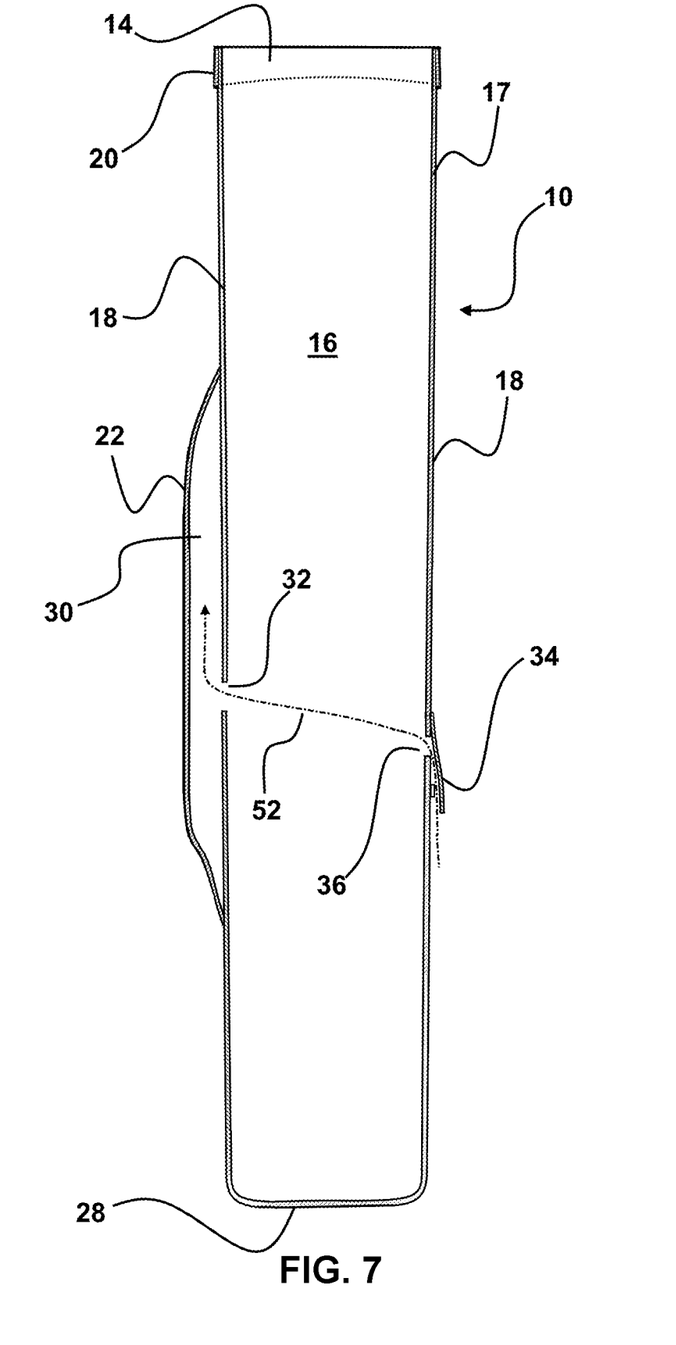
FIG. 7 depicts a side cut-away view of the blanket device herein, and shows the anchor strap pathway communicating through the rear opening, the interior cavity, and the front opening, and into the formed frontal cavity of the device.

In FIG. 7 is shown a side cut-away view of the body 17 of the blanket device 10 herein. As shown, the body 17 has a defined anchor strap pathway 52 which communicates through the rearward opening 36 and into the interior cavity 16 and through the frontal opening 32 to the frontal cavity 30 of the device 10. Such an anchor strap pathway 52 allows the device 10 and a child 12 within it to be secured by such an anchor strap 46 through the anchor strap pathway 52 to the chest clip 44 which is positioned within the frontal cavity 30.

It is this anchor strap pathway 52 which allows the body 17 of the blanket device 10, while still operatively positioned on the child 12, to be moved to other positions, such as between and within various other conventional child carriers 42 having conventional anchor straps 46 extending from the seat of a child carrier 42. Also, the device 10, while still engaged around the torso of a child 12 in the interior cavity 16, can be held and carried around engaged to a child 12 by a parent or caregivers, without the need to remove the body 17 from the child 12. This maintains the body 17 of the device 10 upon the child 12 prior to and after engagement in a child carrier 42, thereby allowing the child to remain warm with their body surrounded by the sidewall 18.

Once the child 12, who already has their torso and legs positioned within the interior cavity 16, is located to a child carrier 42, the anchor strap 46, also known as a crotch strap, is fed through the anchor strap pathway 52 to locate a distal end of the anchor strap 46 within the frontal cavity 30. The distal end of the anchor strap 46 is or can be engaged to a conventional chest clip 44 of a three-point or five-point harness or similar conventional child restraint harness. This chest clip 44 can also be mounted on one of the harness straps 50 and positioned into the frontal cavity 30 through one of the securement openings 48. Thereafter, the harness straps 50 of, for example, a three point or five point child harness are connected to the chest clip 44 on one end thereof in a conventional fashion. The other ends thereof are conventionally secured to the child carrier 42 itself or in some cases to mounts therefore.

It should be noted that any of the different depicted and described configurations and components of the multi positionable infant holder blanket device herein can be employed with any other configuration or component shown and described as part of the device herein. Additionally, while the present invention has been described herein with reference to particular embodiments thereof and/or steps in the method of production or use of such multi positionable child and infant holders, a latitude of modifications, various changes and substitutions are intended in the foregoing disclosure, and it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A child holder apparatus, comprising:
   a body having a sidewall surrounding an interior cavity thereof;
   said body having a front side of said sidewall and a rear side of said sidewall;
   an opening at a first end of said body, said opening communicating with said interior cavity;
   said opening configured for positioning of the legs of a child therethrough and into said interior cavity, to thereby position said body to an as-used position;
   a frontal opening communicating through said sidewall on said front side;
   a rearward opening communicating through said rear side of said sidewall;
   an anchor strap pathway defined by a path running through said rearward opening to said interior cavity, and through said frontal opening from said interior cavity;
   said anchor strap pathway defining a path for communication of an anchor strap therethrough from a first end of said anchor strap connected to a child carrier, to a second end of said anchor strap extending from said frontal opening; and
   said second end of said anchor strap engageable to a chest clip which is concurrently engageable to distal ends of harness straps having respective first ends thereof connected to said child carrier, whereby said child may be positioned into said child carrier and removed therefrom, without removing said body from said as-used position upon said child.

2. The child holder apparatus of claim 1, additionally comprising:
   a frontal material portion engaged to said front side of said sidewall;
   a frontal cavity formed between said frontal material portion and said front side of said sidewall;
   said frontal opening positioned within said frontal cavity;
   securement openings on opposite sides of said frontal material portion; and
   said harness straps communicating through said securement openings whereby said chest clip is positioned within said frontal cavity.

3. The child holder apparatus of claim 1, additionally comprising:
   said body progressively widening from said first end to said second end thereof, thereby forming a narrow portion of said interior cavity at said first end and a wider portion of said interior cavity at said second end.

4. The child holder apparatus of claim 3, additionally comprising:
   a frontal material portion engaged to said front side of said sidewall;
   a frontal cavity formed between said frontal material portion and said front side of said sidewall;
   said frontal opening positioned within said frontal cavity;
   securement openings on opposite sides of said frontal material portion; and
   said harness straps communicating through said securement openings whereby said chest clip is positioned within said frontal cavity.

5. The child holder apparatus of claim 1, additionally comprising:
   elastic material engaged to said opening;
   said opening forming a biased contact thereof to said child with said body in said as-used position; and
   said biased contact preventing air flow though said opening and into said interior cavity.

6. The child holder apparatus of claim 5, additionally comprising:
   a frontal material portion engaged to said front side of said sidewall;

a frontal cavity formed between said frontal material portion and said front side of said sidewall;

said frontal opening positioned within said frontal cavity;

securement openings on opposite sides of said frontal material portion; and said harness straps communicating through said securement openings whereby said chest clip is positioned within said frontal cavity.

7. The child holder apparatus of claim 5, additionally comprising:

said body progressively widening from said first end to said second end thereof, thereby forming a narrow portion of said interior cavity at said first end and a wider portion of said interior cavity at said second end.

8. The child holder apparatus of claim 7, additionally comprising:

a frontal material portion engaged to said front side of said sidewall;

a frontal cavity formed between said frontal material portion and said front side of said sidewall;

said frontal opening positioned within said frontal cavity;

securement openings on opposite sides of said frontal material portion; and said harness straps communicating through said securement openings whereby said chest clip is positioned within said frontal cavity.

\* \* \* \* \*